United States Patent [19]

Adams, Jr.

[11] Patent Number: 5,020,445
[45] Date of Patent: Jun. 4, 1991

[54] TRUCK-TRAIN SYSTEM FOR TRANSPORTING TRUCK TRAILERS ALONG RAILS USING RAILWAY DOLLIES

[76] Inventor: George W. Adams, Jr., 3468 Sandpiper Ct., Hayward, Calif. 94542

[21] Appl. No.: 461,706

[22] Filed: Jan. 8, 1990

[51] Int. Cl.⁵ .......................................... B61D 15/00
[52] U.S. Cl. ...................................... 105/4.1; 105/159; 410/53
[58] Field of Search .................. 105/4.1, 4.2, 4.3, 159, 105/215.1, 215.2; 410/53, 57, 58

[56] References Cited

U.S. PATENT DOCUMENTS

| | | | |
|---|---|---|---|
| 2,036,535 | 4/1936 | Nelson | 105/4.1 X |
| 2,513,552 | 7/1950 | Dove | 410/53 |
| 2,844,108 | 7/1958 | Madden | 105/4.1 X |
| 3,576,167 | 4/1971 | Macomber | 105/368 B |
| 3,581,671 | 6/1971 | Hart | 105/215 |
| 4,179,997 | 12/1979 | Kirwan | 410/53 |
| 4,416,571 | 11/1983 | Krause | 410/53 |
| 4,493,625 | 6/1986 | Shimizu | 105/182 R |
| 4,547,107 | 10/1985 | Krause | 105/4.2 X |
| 4,574,707 | 3/1986 | Hickman | 105/159 |
| 4,653,966 | 3/1987 | Bakka et al. | 105/4.1 X |
| 4,817,536 | 4/1989 | Cripe | 105/182.1 |
| 4,828,452 | 5/1989 | Bolitho | 414/718 |
| 4,938,151 | 7/1990 | Viens | 105/4.3 |

OTHER PUBLICATIONS

Advertising literature for Tandemloc.
Advertising literature for Nycoparc.
Advertising literature for Transit Technology.
Advertising literature for Strick (Trailers and Railtrailer).
Advertising literature for Fontaine Fifth Wheel.
Advertising literature for TRAILMOBILE.
Advertising literature for RYD-A-RAIL.
Advertising literature for trailer parts.
Advertising literature for ROADRAILER.

*Primary Examiner*—Robert J. Oberleitner
*Assistant Examiner*—S. Joseph Morano
*Attorney, Agent, or Firm*—Robert R. Tipton

[57] ABSTRACT

A truck-train system uses a railway dolly or bogie to support the front end of one truck-trailer and the rear end of another truck-trailer. A pair of truck-trailer support members are pivotally connected to the railway dolly. They are provided with a fixed incline ramp to raise and guide the truck-trailer onto the respective support member. The railway dolly is provided with a standard railway compressed air braking system with an air hose retrieving device to store the air hose. The railway dolly is also provided with standard railway couplers at each end. These couplers are adapted to retract or vertically rotate to a position below the surface of the incline planes.

9 Claims, 8 Drawing Sheets

TYPE "E"

TRUCK-TRAIN SYSTEM FOR TRANSPORTING TRUCK TRAILERS ALONG RAILS USING RAILWAY DOLLIES

BACKGROUND OF THE PRIOR ART

This invention relates generally to railway truck-train systems and in particular to a truck-train system incorporating a simplified method of connecting the truck-trailers to a railway dolly or bogie.

Truck-train systems of the prior art that used a railway dolly or bogie as the interface between the truck-trailer and the railway system rails generally required special lifting equipment when connecting the truck-trailer to or mounting it on the railway dolly.

One system used a separate incline ramp to roll the trailer, on its wheels, onto one end of a first railway dolly to which the rear axle of the truck-trailer was attached. The trailer hitch end of the truck-trailer was the attached to a trailer hitch mounted on a pylon on a similar second railway dolly. If a separate incline ramp was not available at the destination, the trailers could not be unloaded.

Another system also mounted the trailer wheels on a railway dolly but connected the front end of the following truck-trailer directly to a special swivel fitting attached to the rear end of the front truck-trailer. A special lifting crane was necessary to mount the truck-trailers on the railway dollies and swivel fittings.

A further truck-train system mounted the truck-trailer wheels on a mechanical platform incorporated into one end of a railway dolly with the trailer hitch end fitted to a trailer hitch attached to a mechanical platform on another railway dolly. The trailer was loaded and unload by moving the mechanical platforms laterally onto a paved area next to the railway tracks.

Another truck-train system used a railway bogie incorporating a platform and pivot pin adapted to connect to a truck-trailer. The platform was raised by a pneumatic system to couple it to the underside of the trailer.

Still another truck-train system used a truck-trailer using a standard fifth wheel truck-trailer hitch at one end and removable rear pneumatic tire wheels at the other end. When used as a railway vehicle, the rear wheels, fitted with pneumatic tires, were removed and replaced with the railway dolly fitted with flanged wheels.

All of these truck-train systems of the prior art failed in their efforts by requiring additional equipment for their operation, such as, separate lifting devices at each destination or special mechanical devices incorporated in the railway dolly itself thus increasing the capital cost of the system and requiring continual maintenance.

In addition, the truck-train systems of the prior art did not take into account the need for compatibility between the truck-train system and railway equipment standards and train operating methods that have evolved over the years.

SUMMARY OF THE INVENTION

The truck-train system of the present invention overcomes these problems in that it comprises a railway dolly having a pivotally connected incline plane or ramp member arranged to slope downward from truck trailer support members located at the top of each ramp. The incline ramp is adapted to engage the rear end of the truck-trailer, raise it up as the trailer is pushed along the incline ramp and guide it to the truck-trailer support member. This operation is performed by the truck that towed the trailer to its loading point. The end of the trailer is connected to the truck-trailer support member either by a standard fifth wheel trailer hitch or a separate connector. The front end of the trailer is adapted to engage a like railway dolly. The like railway dolly is provided with an incline plane or ramp arranged to slope downwardly from a truck trailer fifth wheel connector. This operation is performed by the locomotive connected to the like railway dolly. The truck-trailer unit or locomotive pushes the dolly under the front end of the truck-trailer, raising the trailer up, using the incline plane or ramp, until it is connected to the fifth wheel trailer hitch. The railway couplers connected to each end of the railway dolly are arranged to retract or vertically rotate to a position parallel to and below the level of the surface of the incline planes when the railway dolly is being used to support a truck-trailer.

An air brake system is provided for the railway dolly including an air hose retriever and storage container. The air brake system in connected to the locomotive by serially connecting the air hoses of each railway dolly to the following railway dolly.

It is, therefore, an object of the present invention to provide an improved truck-train system.

It is a further object of the present invention to provide a truck-train system in which loading and unloading truck-trailers can be performed by a standard truck or railway locomotive.

It is another object of the present invention to provide a truck-train system in which separate lifting devices are not used.

It is still a further object of the present invention to provide a truck-train system that interfaces with standard railway equipment.

These and other objects of the present invention will become manifest upon review of the following detailed description when taken together with the drawings.

DESCRIPTION OF THE PREFERRED EMBODIMENT

Figure 1:
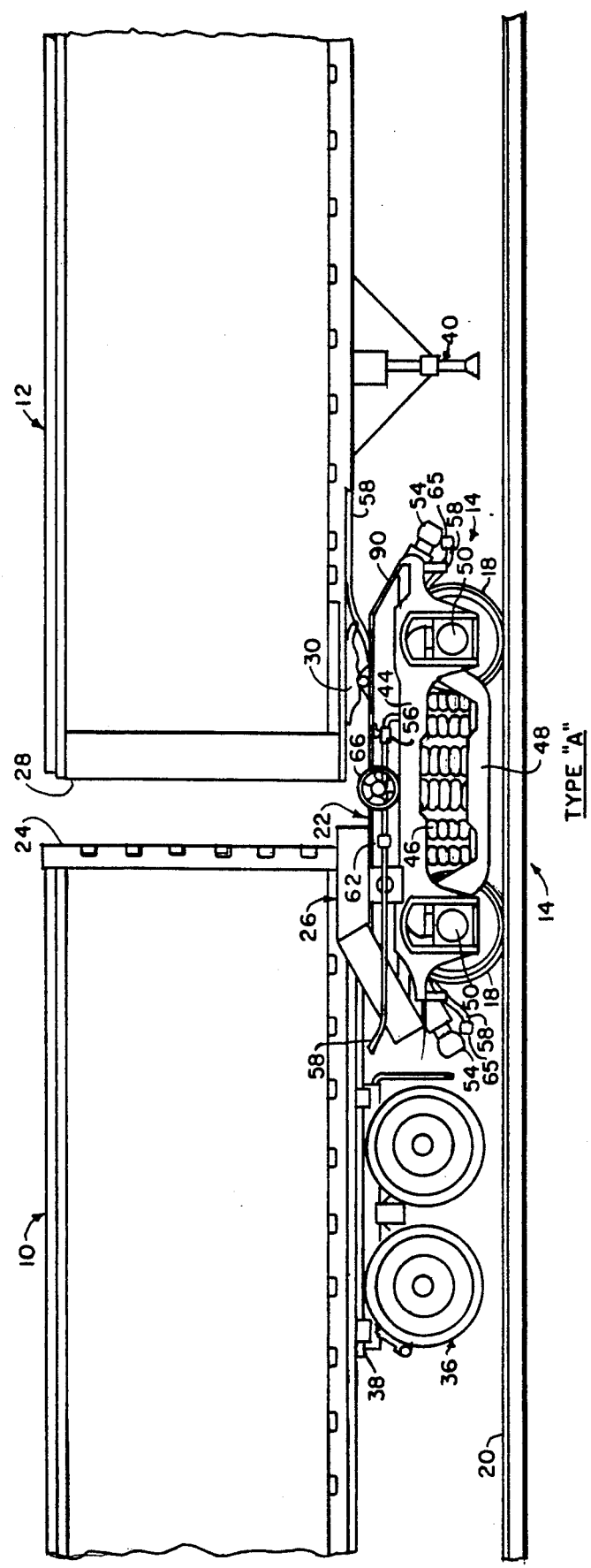
FIG. 1 is a side elevational view of a Type "A" railway dolly for connecting the rear end of one truck-trailer to the front end of another truck-trailer

Referring to FIG. 1, there is illustrated a side elevational view of two truck-trailers 10 and 12 connected to a typical Type "A" railway dolly 14 of the present invention.

Railway dolly 14 comprises, basically, a set of railway wheels 18 adapted to engage track 20 and carry spring mounted carriage frame 22. Spring mounted carriage frame 22, in turn, supports, proximate one end of railway dolly 14, truck-trailer 10 rear wheel end connector member 26 for connecting truck-trailer rear end 24 to railway dolly 14 and, proximate the other end, truck-trailer 12 fifth wheel hitch end connector member 30 for connecting truck trailer front end 28 to railway dolly 14.

Truck-trailers 10 and 12 are, for the most part, standard types of roadable trailers having a set of pneumatic tired rear wheels 36 either fixed to the underside of the rear portion of the trailer or movable fore and aft along a connector rail 38 attached to the underside of the trailer, as shown for truck-trailer 10. Proximate the front end of each trailer is a pair of vertically adjustable support stanchions 40 to maintain the trailer level when disconnected from the railway dolly or truck-tractor rig (not shown in FIG. 1).

Figure 2:
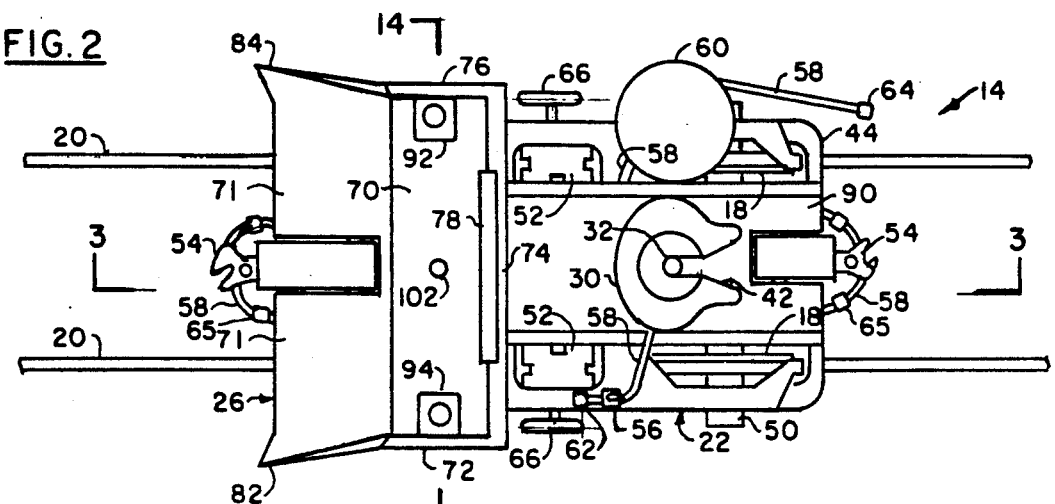
FIG. 2 is top view of the Type "A" railway dolly of FIG. 1.
Figure 3:
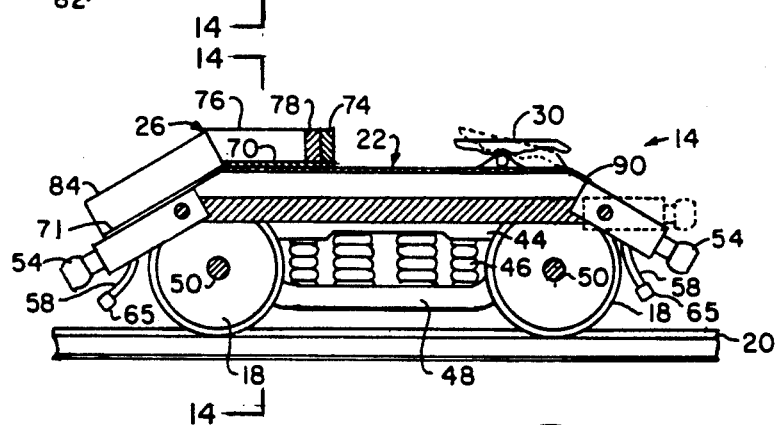
FIG. 3 is an elevational, partial cross-sectional view of the Type "A" railway dolly of FIGS. 1 and 2.

Referring to FIGS. 2 and 3, there is illustrated, respectively, a top and cross-sectional side views of the Type "A" railway dolly 14 of FIG. 1 comprising, basically, two pair of railway wheels 18 connected to a spring mounted carriage frame 22.

Spring mounted carriage frame 22 comprises a main support frame 44 resting on support springs 46 supported by wheel base frame 48. The respective ends of wheel base frame 48 are journalled to respective axles 50 connected to each set of wheels 18. A standard railway drop coupler assembly 54 is pivotally connected to swing vertically proximate each end of wheel base frame 48.

Type "A" railway dolly 14 further comprises an air brake system 52, well know in the art, and for this reason not shown in detail. Connected to air brake system 52 is first air hose coupler 62 connected in fluid communication with air valve 56. A standard train air hose 58, which is mechanically connected to air hose retriever and storage reel 60, is also fluidly connected to the other side of air valve 56. A second air hose coupler 64 is connected to the other end of standard train air hose 58 stored on reel 60. First air hose coupler 62 is adapted to connect to the air hose coming from next forward railway dolly supporting the front end of the trailer that is connected to rear end support member 26 of FIGS. 1, 2 and 3. Second air hose coupler 64 is connected to the air hose coupler for the next rear railway dolly supporting the rear end of the trailer 12 whose front end is supported by fifth wheel hitch connector member 30 of FIGS. 1, 2 and 3.

Standard air hose coupler 65 is connected to air hose 58 is also provided adjacent railway drop coupler assembly 54. Air hose 58 and air hose coupler 65 are used when connecting the railway dollies to each other or to a standard locomotive air brake system. A manual handbrake 66 is provided for locking and releasing wheels 18 when dolly 14, or any of the various dolly configurations, are not connected to a compressed air system.

The above configuration is basic to all railway dollies used in the present truck-train system.

Truck-trailer rear wheel connector member 26 is pivotally connected to main support frame 44. Connector member 26 comprises truck-trailer rear end support member 70 and incline plane or ramp 71 adapted to slidably engage the rear end 24 of truck-trailer 10 (FIG. 1) and to raise it to the level of rear end support member 70.

Attached to the peripheral edges of truck-trailer support member 70 are raised side edges 72 and 76. A raised back side or stop 74 is attached to the back edge of support member 70. The distance between side edges 72 and 76 is arranged to be slightly larger that the width of truck-trailer 10. An elastomer bumper member 78 is attached to the inner side of raised back side or stop 74 to cushion the impact of the rear of truck-trailer 10 on raised side 74.

A pair of outward slanting sides 82 and 84 are attached to the outer side edges of incline plane 71 to define a scoop configuration. Sides 82 and 84 are adapted to enclose and engage the rear bottom side edges of truck-trailer 10 and guide it as it slides upwardly to truck-trailer support member 70. Simultaneously, incline plane 71 is adapted to engage the bottom rear edge of truck-trailer 10 and also lift it upwardly to truck trailer support member 70.

A pair of truck-trailer connected members 92 and 94 are located, respectively, adjacent side edges 72 and 76.

Pivot pin 102 in support member 70 pivotally connects rear wheel connector member 26 to spring mounted carriage frame 22.

Type "A" railway dolly 14 further comprises truck-trailer front end connector member or fifth wheel hitch 30 which is also pivotally connected to the other end of railway dolly 14 spring mounted carriage frame 22 distal truck trailer rear end connector member 26. A second incline ramp or plane 90 is adapted to slope downwardly from the point where the front end of fifth wheel hitch 30 touches the top of spring mounted carriage frame 22 at the top of incline plane 90. Incline plane 90 is adapted to slidably engage the front end of hitch 30 of truck-trailer 12 and raise it up to fifth wheel trailer hitch 30, then slidably engage the front end and then the top surface of hitch 30. The front end of truck-trailer 12 is then guided to the locked position using king pin 150 attached to the underside of the truck-trailer (FIG. 13) being guided by the V-groove opening 42 in hitch 30 to engage locking member 32.

Figure 4:
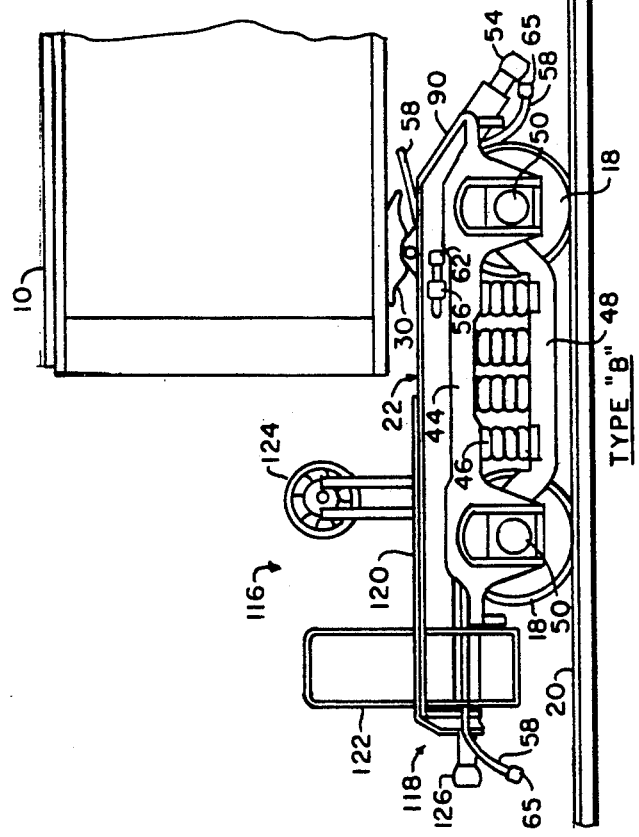
FIG. 4 is a side elevational view of a Type "B" railway dolly having one end adapted to couple to a standard railway locomotive and the other end connected to the front end of a truck-trailer.

Referring to FIG. 4, there is illustrated a side elevational view of Type "B" railway dolly 116. Type "B" railway dolly 116 is used as the interface between the head end of the assembled truck-train and a standard type of railway locomotive (not shown).

Figure 5:
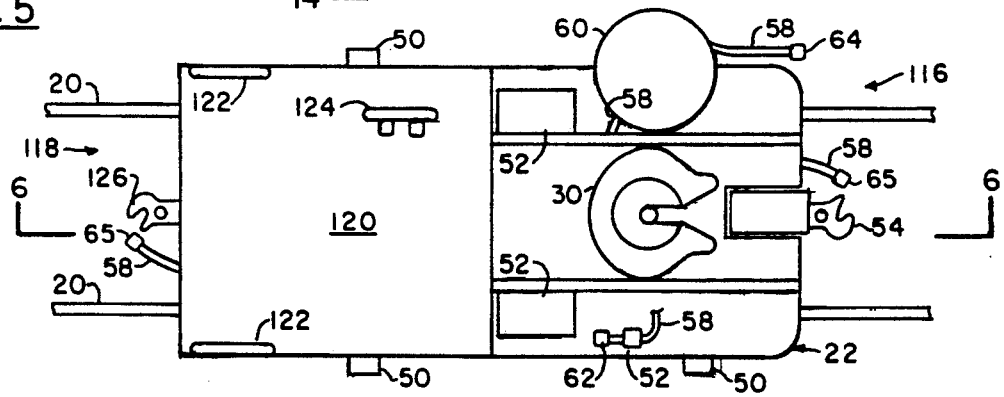
FIG. 5 is top view of the Type "B" railway dolly of FIG. 4.
Figure 6:
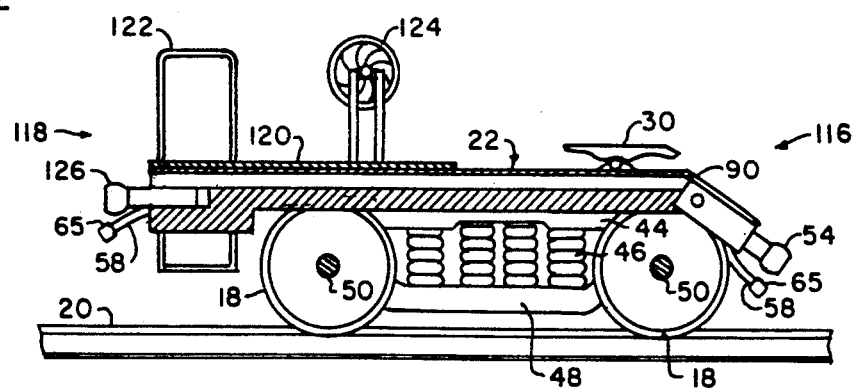
FIG. 6 is an elevational, partial cross-sectional view of the Type "B" railway dolly of FIGS. 4 and 5 taken at line 6—6 of FIG. 5.

Referring to FIGS. 5 and 6, there is illustrated, respectively, a top view and an elevational cross-sectional side view of the railway dolly of FIG. 1.

The fifth wheel trailer hitch side of railway dolly 116 (the right side in FIGS. 5 and 6) is identical in configuration to the trailer hitch side (right side) of railway dolly Type "A" of FIGS. 1, 2 and 3. The reference numerals in FIGS. 5 and 6 for the trailer hitch side of railway dolly 116 are identical to those for the railway dolly 14 of FIGS. 2 and 3.

The locomotive interface side 118 (left side in FIGS. 4, 5 and 6) of Type "B" railway dolly 116, however, comprises a riding platform 120 attached to the top of main support frame 44 having a set of handrails 122 used by a trainman for mounting platform 120 and a hand brake 124 for locking and unlocking the railway dolly brakes (not shown). A standard train coupler 126, adapted to pivot horizontally and connect to a like railway coupler connected to a locomotive (not shown), is also connected to wheel base support frame 48.

Figure 7:
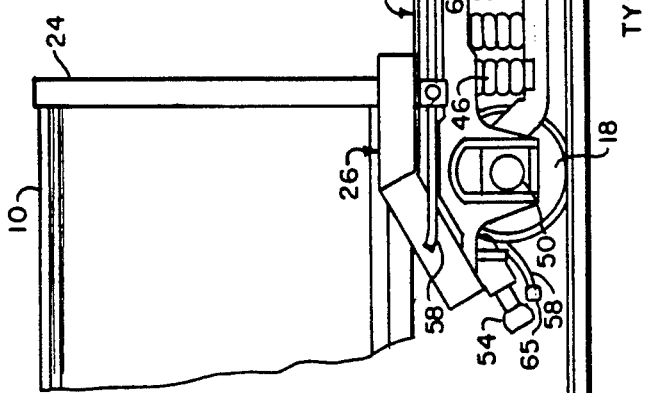
FIG. 7 is a side elevational view of a Type "C" railway dolly having one end adapted to being coupled to a standard railway locomotive and the other end connected to the front end of a truck-trailer.

Referring to FIG. 7, there is illustrated a side elevational view of Type "C" railway dolly 130. Type "C" railway dolly 130 is used as the interface of the rear end of the assembled truck-train to a standard type of railway locomotive (not shown) or rear end warning car as may be required. Type "C" railway dolly 130 could also be provided with its own rear end warning lights or signals where required. The same typical warning lights or signals can be provided for the other railway dolly configurations 14 (Type "A"), 116 (Type "B"), 146 (Type "D"), and 160 (Type "E").

Figure 8:
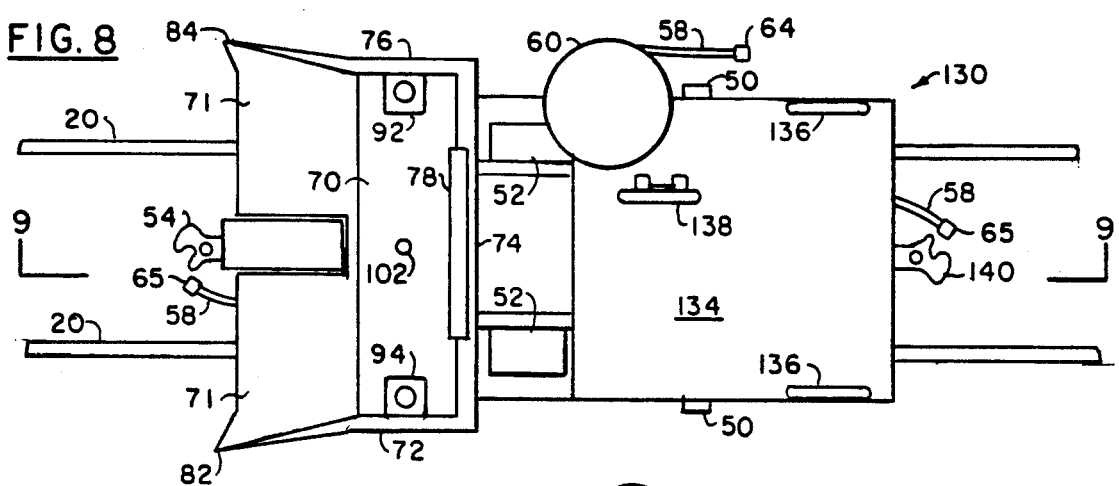
FIG. 8 is top view of the Type "C" railway dolly of FIG. 7.
Figure 9:
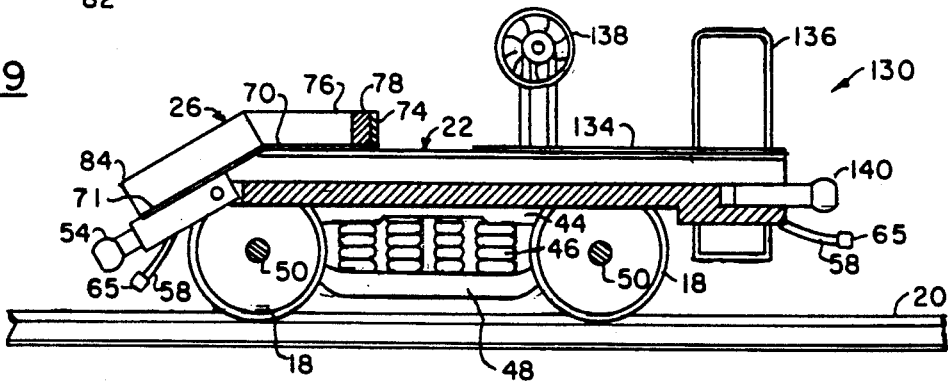
FIG. 9 is an elevational, partial cross-sectional view of the Type "C" railway dolly of FIGS. 7 and 8 taken at line 9—9 of FIG. 8.

Referring to FIGS. 8 and 9, there is illustrated, respectively, a top view and an elevational cross-sectional side view of railway dolly 130 of FIG. 7.

The truck trailer rear end connector member side of railway dolly 130 (the left side of FIGS. 8 and 9) is identical in configuration to the truck-trailer rear end connector member side (left side) of railway dolly Type "A" of FIGS. 1, 2 and 3. The reference numerals in FIGS. 8 and 9 for the truck-trailer rear end connector member side of railway dolly 130 are identical to those for the railway dolly 14 of FIGS. 2 and 3.

The locomotive interface side 132 (right side) of Type "C" railway dolly 130, however, comprises a riding platform 134 attached to the top of spring mounted carriage frame 22 having a set of handrails 136 used by a trainman for mounting platform 134 and a hand brake 138 for locking and unlocking the railway dolly brakes (not shown). A standard train coupler 140, adapted to pivot horizontally and also connect to a like railway couple connected to a locomotive, is connected to railway dolly wheel base support frame 48.

Figure 10:
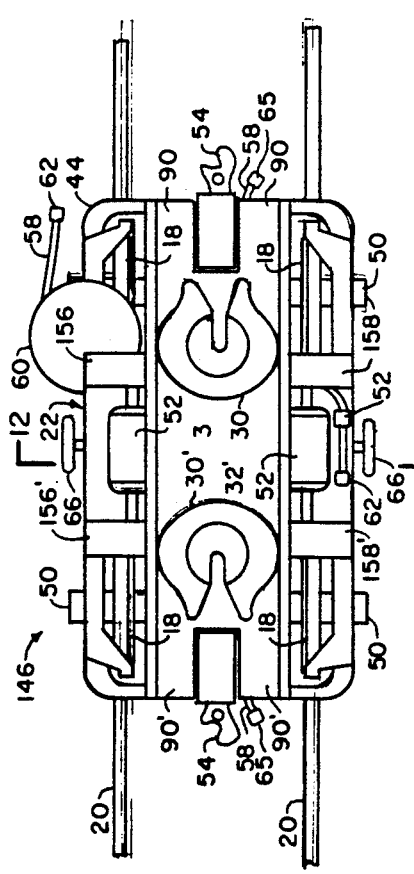
FIG. 10 is top view of the Type "D" railway dolly of FIGS. 11 and 12.
Figure 11:
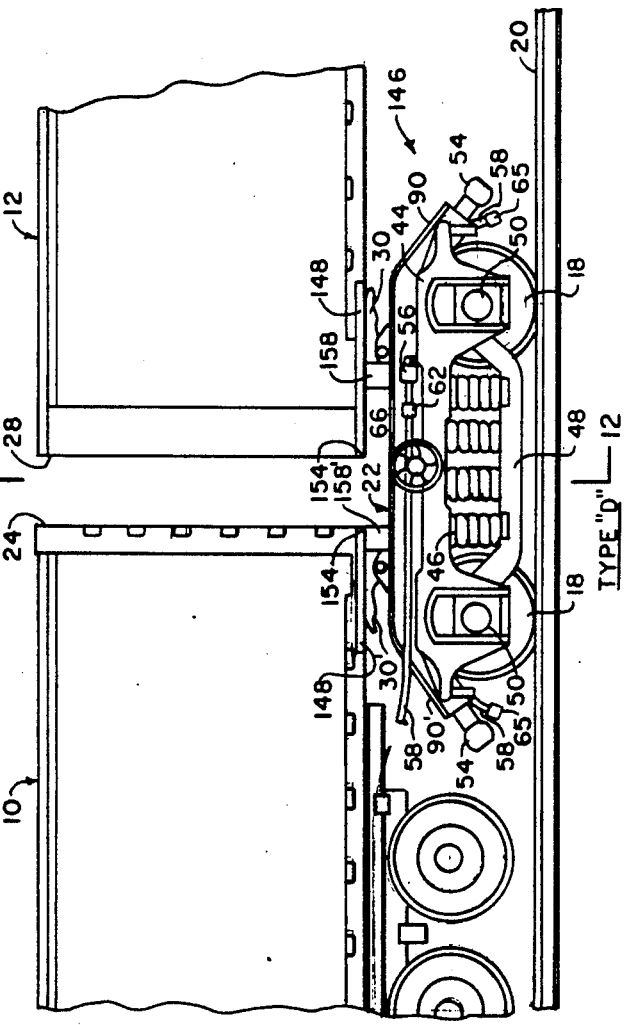
FIG. 11 is a side elevational view of Type "D" railway dolly for connecting either end of one truck-trailer to either front end of another truck-trailer.

Referring to FIG. 10 and 11 there is illustrated top and side elevational views of Type "D" bi-directional railway dolly 146.

Railway dolly 146 is a modification of Type "A" railway dolly 14 (FIGS. 2 and 3), in that truck-trailer rear wheel connected member 26 of Type "A" dolly 14 is replaced by a second fifth wheel hitch 30' and second ramp 90'. In other words, the two ends of bi-directional railway dolly 146 are mirror images of each other.

Figure 13:
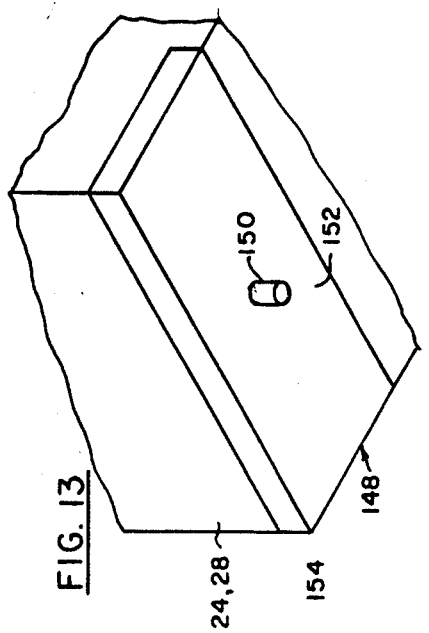
FIG. 13 is an isometric view of the underside of the rear portion of a typical truck trailer showing the location of the coupler/king pin assembly for use with a fifth wheel trailer hitch.
Figure 19:
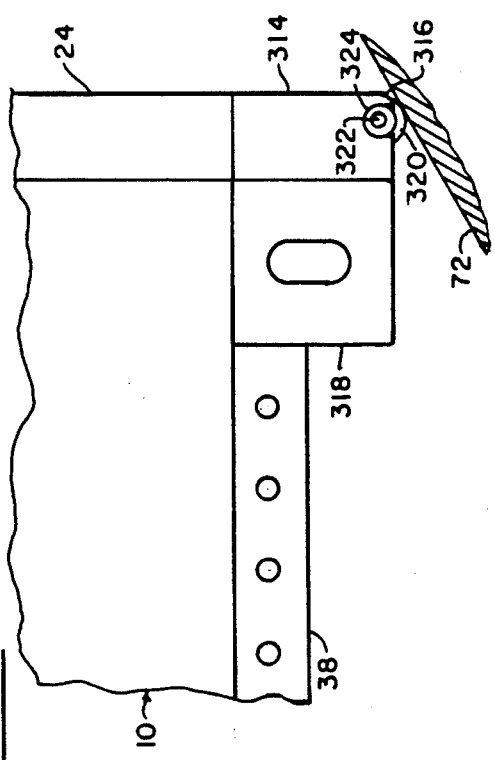
FIG. 19 is an elevational side view of the rear portion of a typical truck-trailer showing the device for connecting the rear end of the trailer to the railway dolly and the means for reducing friction when loading the rear of the trailer onto the railway dolly using the incline plane.

To accommodate this configuration, the rear end of truck-trailer 10 must be fitted with an upper coupler/king pin assembly 148 as shown in FIG. 13. FIG. 13 is an isometric view of the underside of the rear end of truck trailer 10. Upper coupler/king pin assembly 148 comprises a king pin 150 adapted to engage the central hole 32 of fifth wheel trailer hitch 30 and be locked in place. Upper coupler/king pin assembly 148 also comprises coupler bearing plate 152 adapted to bear against and slidably engage the top surface of fifth wheel hitch 30. The bottom edge 154 of coupler bearing plate 152 is particularly reinforced and rounded or otherwise provided with anti-friction means, such as rollers or the like. This anti-friction means is adapted to reduce the frictional forces imposed thereon when bottom edge 154 of coupler bearing plate 152 is in slidable engagement with incline plane 90 as it is raised and lowered from fifth wheel trailer hitch 30. Typically, such anti-friction means is shown in FIG. 19.

Figure 12:
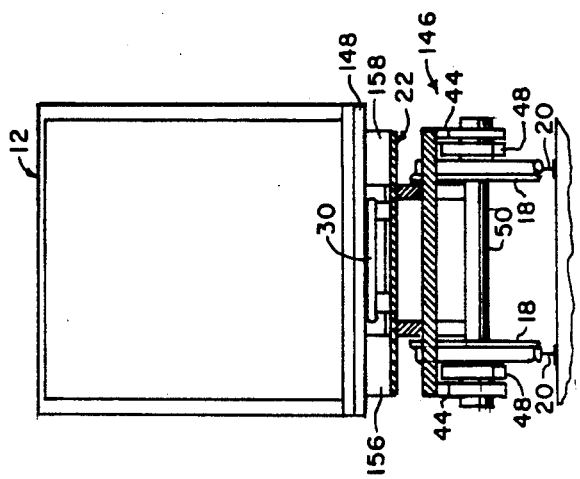
FIG. 12 is an elevational cross-section of a Type "D" railway dolly taken at line 12—12 of FIGS. 10 and 11.

Referring to FIG. 12, there is illustrated an elevational cross-section of bi-directional railway dolly 146 taken at lines 12—12 of FIGS. 10 and 11. Because both ends of the truck-trailer are supported by fifth wheel trailer hitches 30 and 30', there will be a tendency of the trailer to tip over because of the narrow width of hitches 30 and 30'. To prevent such tipping, a set of bolsters 156 and 158 (156' and 158') are provided outboard of trailer hitches 30 and 30' which are mounted on spring mounted carriage frame 22. As the railway dolly mounted truck-trailer negotiates a curve, the side sway will be arrested by bolsters 156 and 158 (156' and 158').

Figure 14:
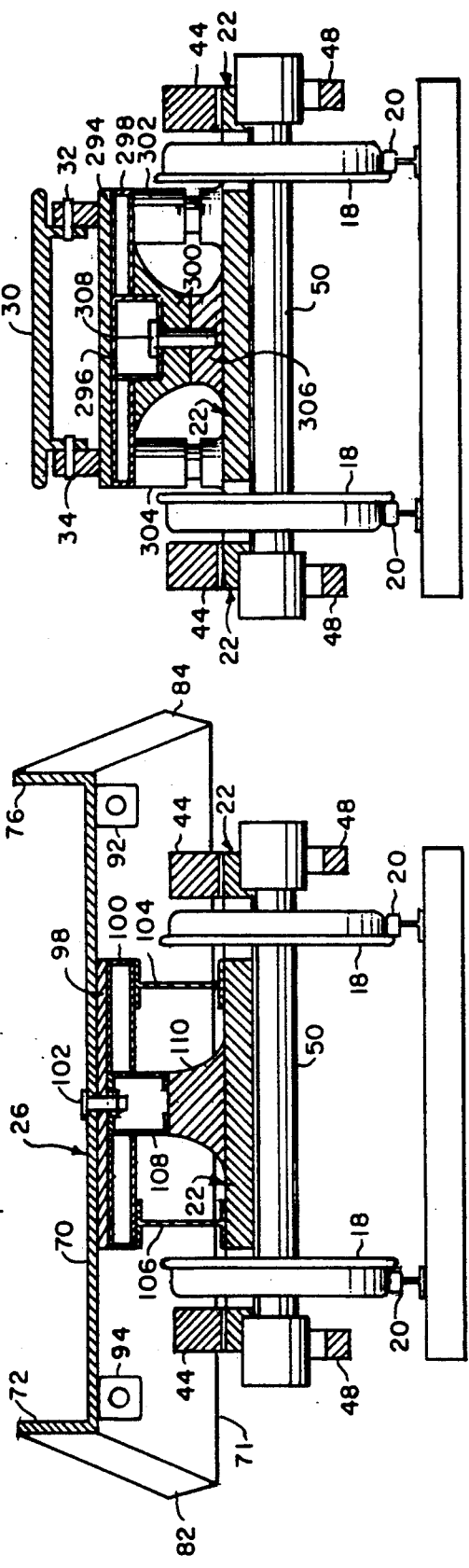
FIG. 14 is an elevational cross-section of the Type "A" railway dolly of FIG. 2 taken at line 14—14.

With reference to FIG. 14, there is illustrated an elevational cross section of a typical Type "A" railway dolly taken at line 14—14 of FIGS. 2 and 3. FIG. 14 illustrates the configuration of truck-trailer rear end connected member 26 and the method of pivotally connecting it to railway dolly 14.

Truck-trailer rear end connector member 26 is pivotally connected to spring mounted Carriage frame 22 of Type "A" railway dolly 14 using a bearing plate 98 mounted on support ring 100. Central channel 108 is mounted on central pylon 110 attached to the top surface of spring mounted carriage frame 22. Truck-trailer rear end support member 70 is pivotally connected to bearing plate 98 and central channel 108 by pivot pin 102. When the rear end 24 of truck-trailer 10 is connected to truck-trailer rear end connector member 26 using first and second container locking members 90 and 92, the entire rear end connector member 26 will be allowed to pivot or rotate horizontally about pivot pin 102 as the truck-trailer unit train negotiates a curve.

A pair if I-beams 104 and 106 are provided between the underside of support ring 100 and the top surface of spring mounted carriage frame 22 to provide lateral support for rear end connector member 26 as the truck-train unit negotiates a curve.

Figure 15:
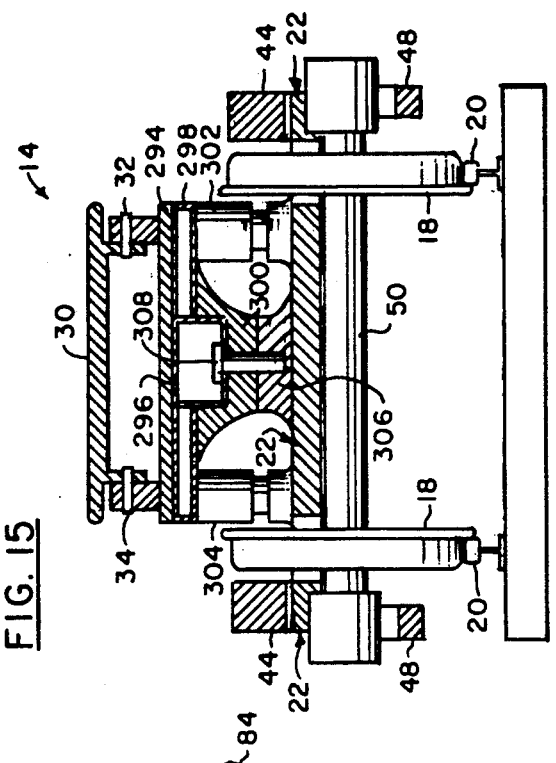
FIG. 15 is and elevational cross-section of the type "A" railway dolly of FIG. 2 taken at line 15—15.

With reference to FIG. 15, there is illustrated an elevational cross section of Type "A" railway dolly 14 of FIGS. 2 and 3 taken at lines 15—15.

Fifth wheel trailer hitch 30 is mounted, using pivot pins 32 and 34, on spring mounted carriage frame 22 by first attaching it to fifth wheel support plate 294 which is supported by central channel 296 and supported at the outer edge of support plate 294 by support channel 298. Central channel 296 is contained in support pylon 300. Support pylon 300 is connected to mounting pylon 306 attached to the top of spring mounted carriage frame 22. A pair of supporting bolsters 302 and 304 proximate the outer periphery of support channel 298 provide lateral support for fifth wheel trailer hitch 30 to carry any tipping moment caused when the truck-trailer attached to fifth wheel trailer hitch is negotiating a curve.

Figure 16:
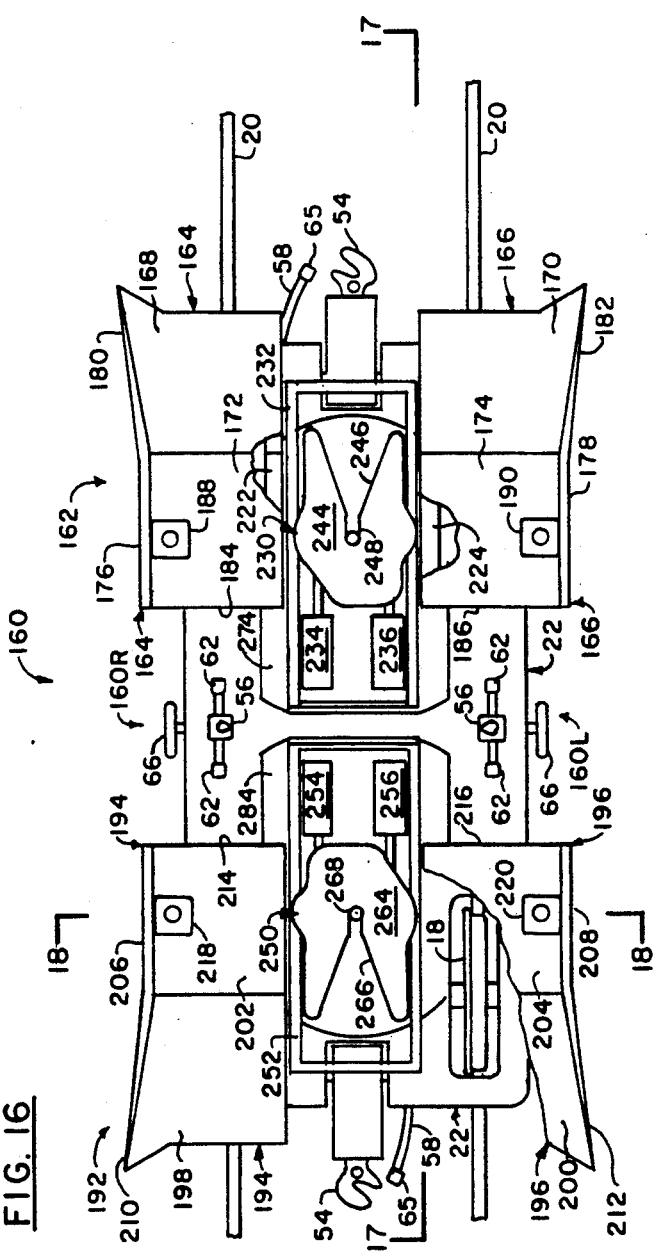
FIG. 16 is a top view of a typical Type "E" universal bi-directional railway dolly of the present invention.
Figure 18:
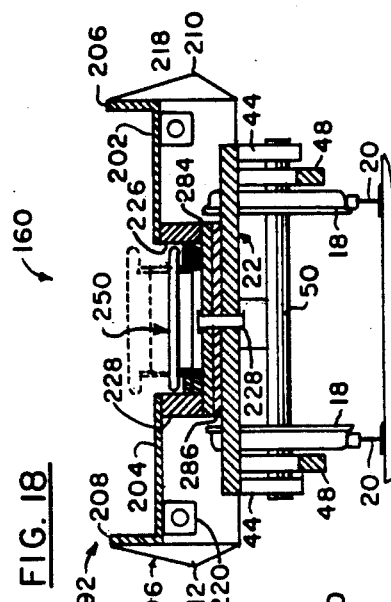
FIG. 18 is an elevational cross-section of the railway dolly of FIGS. 17 and 18 taken at line 18—18.
Figure 17:
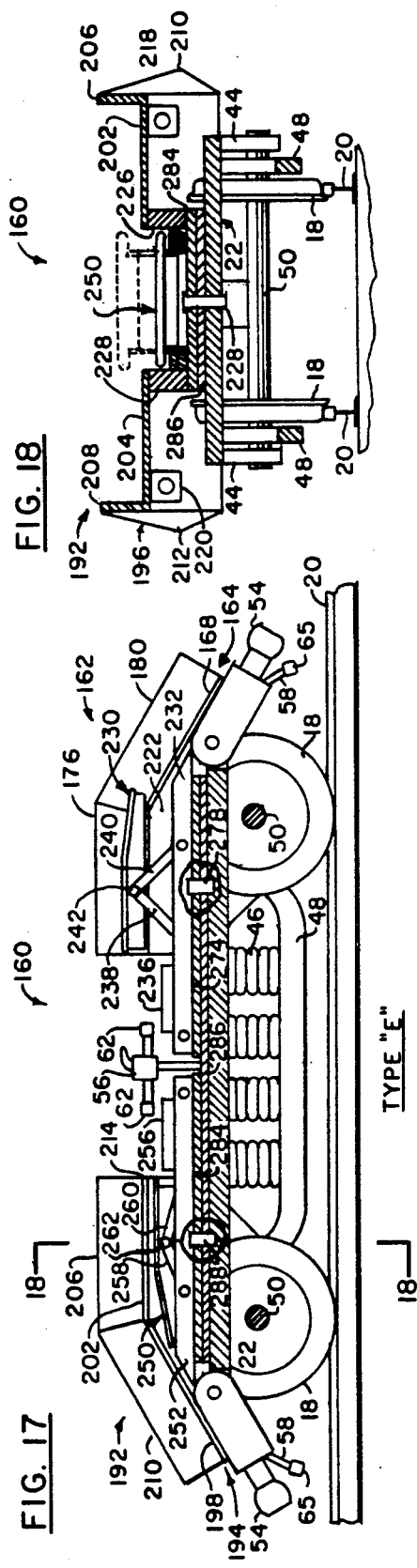
FIG. 17 is an elevational cross-section of the universal bi-directional railway dolly of FIG. 16 taken at line 17—17.

Referring to FIG. 16, 17, and 18, there is illustrated a Type "E" railway dolly 160 of the present invention. Type "E" railway dolly 160 is a universal bi-directional dolly with mirror image features at each end that are adapted to receive either the front or rear end of a truck-trailer of the type shown in FIG. 1. FIG. 16 is a top view of railway dolly 160 while FIG. 17 is a side elevational section taken at lines 17—17 of FIG. 16. FIG. 18 is an elevational cross-section of railway dolly 160 taken at lines 18—18 of FIGS. 16 and 17.

Railway dolly 160 comprises a right side 160R and a left side 160L to which the various elements of the dolly will be referenced In particular, railway dolly 160 comprises a first bi-directional truck trailer rear end connector member 162 comprising a right first rear end connector member side 164 and a left rear end connector member side 166. Respective right and left rear end connector members 164 and 166 each comprise, respectively, right and left incline planes 168 and 170, right and left truck trailer rear end support members 172 and 174, right and left raised sides 176 and 178, right and left outward slanting sides 180 and 182, right and left back sides 184 and 186, and right and left container locking members 188 and 190.

Proximate the other end of railway dolly 160 there is connected a duplicate or second rear end connector member 192. Second bi-directional truck-trailer rear end connector member 192 comprises a right first rear end connector member side 194 and a left rear end connector member side 196. Respective right and left rear end connector members 194 and 196 each comprise, respectively, right and left incline planes 198 and 200, right and left truck-trailer rear end support members 202 and 204, right and left raised sides 206 and 208, right and left outward slanting sides 210 and 212, right and left back sides 214 and 216, and right and left container locking members 218 and 220.

Referring to FIGS. 17 and 18, second bi-directional truck-trailer rear end connector member 192 is mounted on second rotating bearing plate 284 by second right and left support beams 226 and 228. Second rotating bearing plate 284 is pivotally connected to second fixed bearing plate 286 by second pivot pin 288. Second fixed bearing plate 286 is, in turn, attached to the top surface of spring mounted carriage 22.

In a similar manner first bi-directional truck-trailer rear end connector member 162 is mounted on first rotating bearing plate 274 by first right and left support beams 222 and 224. First rotating bearing plate 274 is pivotally connected to first fixed bearing plate 276 by first pivot pin 278. First fixed bearing plate 276 is, in turn, attached to the top surface of spring mounted carriage 22.

Located between right first rear end connector member 164 and left first rear end connector member 166 is first height adjustable fifth wheel trailer hitch 230. Hitch 230 comprises a fifth wheel hitch support frame 232 attache dot the top surface of first rotating bearing plate 274 and adapted to rotate with first bi-directional truck-trailer rear end connector member 162.

Hitch 230 further comprises first and second hydraulic piston and cylinder units 234 and 236 whose pistons are connected to linkage members 238 and 240 on each side of fifth wheel hitch bearing plate 244. As hydraulic pressure is applied to the cylinders of units 234 and 236, linkage members 238 and 240, pivotally connected to fifth wheel bearing plate 244 by pivot pin 242 will cause bearing plate 244 to rise to a level slightly above the plane of rear end support members 172 and 174.

A similar configuration is located proximate the other end of Type "E" railway dolly 160 between right and left second rear end connector members 194 and 196. In particular, located between right second rear end connector member 194 and left first rear end connector member 196 is second height adjustable fifth wheel trailer hitch 250. Hitch 250 comprises a fifth wheel hitch support frame 252 attached to the top surface of second rotating bearing plate 284 and adapted to rotate with second bi-directional truck-trailer rear end connector member 192.

Hitch 250 further comprises first and second hydraulic piston and cylinder units 254 and 256 whose pistons are connected to first and second linkage members 258 and 260 on each side of fifth wheel hitch bearing plate 264. As hydraulic pressure is applied to the cylinders of units 254 and 256, linkage members 258 and 260, pivotally connected to fifth wheel bearing plate 264 by pivot pin 262 causing raise bearing plate 264 to rise to a level slightly above the plane of rear end support members 202 and 204.

Thus, each end of Type "E" railway dolly 160 can receive either end of a truck-trailer on either end of the dolly.

Figure 20:
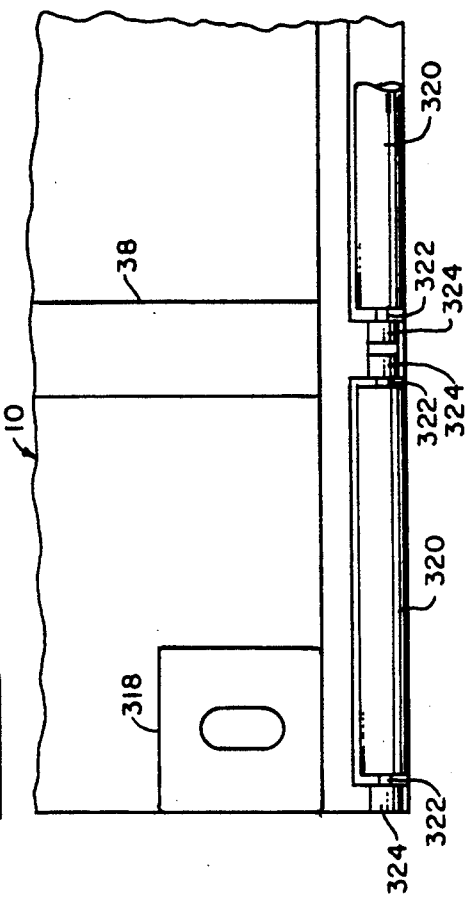
FIG. 20 is a bottom view of the rear end of the trailer shown in FIG. 19.

Referring to FIGS. 19, there is illustrated a side elevational view of the bottom portion of rear end 24 of a typical truck-trailer 10. FIG. 20 is a bottom view of the truck-trailer rear corner of FIG. 19.

In FIGS. 19 and 20, a truck trailer bulkhead 314 is attached to the bottom rear edge of truck-trailer 314 just behind truck-trailer connector member 318. Truck-trailer bulkhead 314 comprises a rounded portion 316 along the bottom outside edge. Several rollers 320 are provided along the bottom edge of bulkhead 314 proximate rounded portion 316. Rollers 320 are provided with a shaft 322 at each end on which is journaled anti-friction bearing 324 mounted in and attached to bulkhead 314. Rollers 320 are adapted to engage incline plane or ramp 71 and top support member 70 of rear wheel connector member 26 in order to reduce the frictional forces when pushing trailer 10 up incline plane or ramp 71. It can be seen that this would also apply to the incline plane or ramp of dolly 160.

When bulkhead 314, attached to the bottom rear end 24 of truck trailer 10, reaches the top of ramp 71 and engages truck-trailer rear end support member 70 as it slides further along, anti-friction rollers 320 will also engage the top surface of support member 70 and reduce the force necessary to move rear end 24 of trailer 10 back to a point where truck-trailer connector member 318 in aligned with container locking members 90 and 92 (FIGS. 14 and 15) or 188, 190, 218 and 220 (FIGS. 16 and 18).

OPERATION

To assemble a train of truck-trailers, a typical Type "A", "B", "C", "D" or "E" railway dolly 14, 116, 130, 146, or 160 is arranged to receive the rear end of a typical truck-trailer 10 by first applying the hand brake to hold the railway dolly in place.

Using Type "A" railway dolly 14 as the initial example, truck-trailer 10 is first backed into truck-trailer rear end connector member 26 of railway dolly 14, using a standard truck-tractor rig (not shown), causing rollers 320 of rear end bulkhead 314 attached to the rear end 24 of the truck-trailer 10 to engage incline plane 71. Rear end 24 of truck-trailer 10 is pushed back until truck-trailer connector members 318 on each side of truck-trailer 10 are aligned with first and second container locking members 92 and 94.

Container locking members 92 and 94 are then locked into connector members 318. The truck trailer 10 is then aligned along the centerline of railway tracks 20, truck-trailer support stanchion 40 is then lowered to ground level, the fifth wheel of the truck-tractor rig (not shown) is unlocked from the front of the truck trailer and the truck-tractor rig removed.

A second Type "A" railway dolly 14 is positioned on tracks 20 in front of trailer 10 with truck trailer fifth wheel connector member 30 facing the front end of truck-trailer 10. An ordinary truck-trailer rig or a roadable truck-trailer rig 330 having flanged railway wheel guides 322 (FIG. 21) or a railway locomotive (not shown) is used to push the second Type "A" railway dolly under the front end of truck-trailer 10 so that the front end of bulkhead 314 engages incline plane or ramp 90 to then engage fifth wheel connector member 30. The railway dolly is pushed further until king pin 150 (FIG. 13) engages the side of V-groove 42 on fifth wheel connector member 30 to guide it to king pin locking member 32. King pin 150 is then locked in king pin locking member 32 to complete the assembly.

Air hoses are then unreeled from hose real 60 with air hose coupler 62 on one railway dolly and connected to air hose couple 64 of the other railway dolly.

The assembled unit is now ready to receive another truck-trailer unit.

Figure 21:
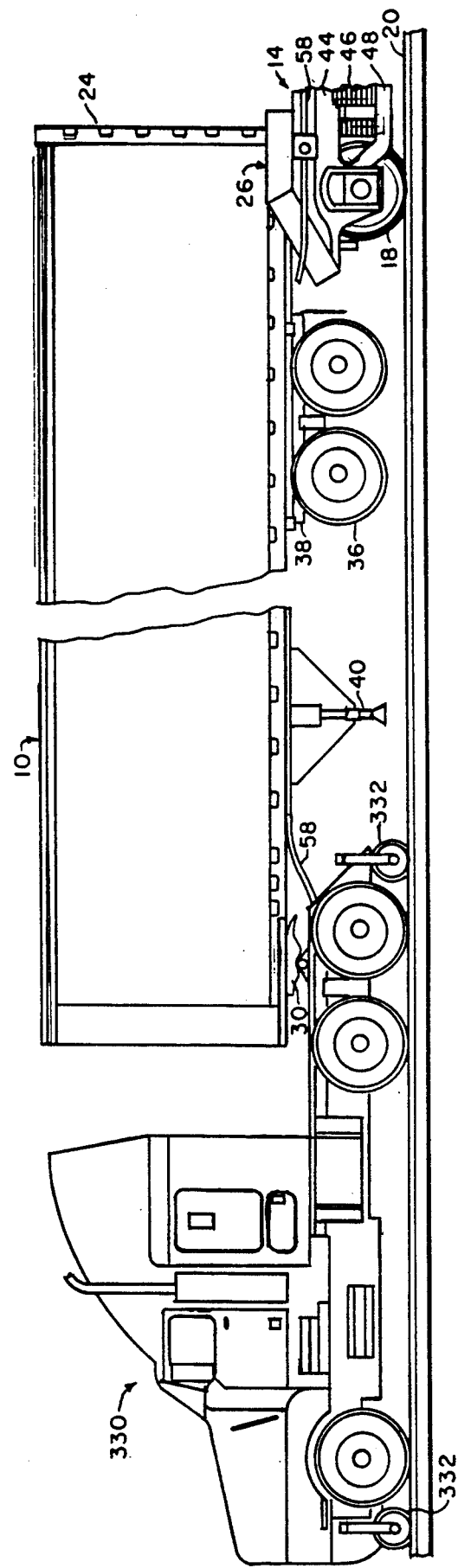
FIG. 21 is a side elevational view of a typical truck-train system being pulled by a roadable/rail truck-tractor rig.

When the unit train is assembled, is can be pulled either by a standard locomotive (not shown) or a rail guided roadable truck-tractor rig shown in FIG. 21.

In a similar manner, the unit truck-train can also be assembled using the other railway dollies. For the Type "D" and "E" bi-directional railway dollies of FIGS. 10, 11 and 12 and FIGS. 16, 17 and 18, it is not necessary to position the end of the dolly to match the front or rear end of the truck-trailer.

Although the present embodiments illustrate the use of a standard U.S. railway truck assemblies, other railway truck assemblies can be adapted for use of the present system, such as, the Gloucester railway truck assemblies used in Great Britain and Europe.

Although a preferred embodiment has been described in detail, it can be seen that a person having skill in the art may conceive other embodiments employing comparable elements or that certain elements may be modified, combined or changed but still come within the scope of the following claims.

I claim:

1. A truck-train apparatus comprising
   at least a first truck-trailer and a second truck-trailer each comprising
   a fifth wheel connector end,
   a rear wheel end, and
   a set of roadable wheels connected to said truck-trailer proximate said rear wheel end,
   a railway dolly having a first end and a second end,
   means for connecting said first truck-trailer fifth wheel end to said first end of said railway dolly comprising
   a first generally horizontal truck-trailer support member pivotally connected to said railway dolly,
   a first incline ramp member sloping downward from said first generally horizontal truck-trailer support member adapted to engage said first wheel connector end of said first truck-trailer and guide said fifth wheel connector end up to said first generally horizontal truck-trailer support member, and
   means for connecting said first truck-trailer fifth wheel connector end to said first generally horizontal truck-trailer support member,
   means for connecting said second truck-trailer rear wheel end to said second end of said railway dolly comprising
   a second generally horizontal truck-trailer support member pivotally connected to said railway dolly,
   a second incline ramp member having generally vertical side members extending upwardly therefrom, said ramp sloping downward from said second generally horizontal truck-trailer support member and adapted to engage said rear wheel end of said second truck-trailer proximate the bottom and vertical sides thereof and guide said rear wheel end up to said second generally horizontal truck-trailer support member, and
   means for connecting said second said second truck-trailer rear wheel end to said second generally horizontal truck-trailer support member.

2. A truck-train apparatus comprising
   at least a first truck-trailer and a second truck trailer each comprising
   a fifth wheel connector end,
   a rear wheel end,
   a fifth wheel king pin connected to said fifth wheel connector end,
   a set of roadable wheels connected to said truck-trailer proximate said rear wheel end,
   a railway dolly having a first end and a second end,
   means for connecting either end of said first truck-trailer to said first end of said railway dolly comprising
   a first generally horizontal truck-trailer support member pivotally connected to said railway dolly,
   a second generally horizontal truck-trailer support member pivotally connected to said railway dolly adjacent said first generally horizontal truck-trailer support member,
   an incline plane ramp member sloping downward from said first and second generally horizontal truck-trailer support members adapted to engage said fifth wheel connector end of said first truck-trailer and guide said fifth wheel connector end up to said first generally horizontal truck-trailer support member and also adapted to engage said rear wheel end of said first truck-trailer and guide said rear wheel end up to said second generally horizontal truck-trailer support member, means for connecting said fifth wheel king pin of said first truck-trailer to said first generally horizontal truck-trailer support member, and means for connecting said rear wheel end of said first truck-trailer to said second generally horizontal truck-trailer support member.

3. The truck-train apparatus as claimed in claim 2 further comprising means for raising and lowering said first generally horizontal first truck-trailer support member.

4. The truck-train apparatus as claimed in claim 2 further comprising means for connecting either end of one of said second truck-trailer to said second end of said railway dolly comprising a third generally horizontal truck-trailer support member pivotally connected to said railway dolly, a fourth generally horizontal truck-trailer support member pivotally connected to said railway dolly adjacent said first generally horizontal truck-trailer support member, a second incline plane ramp member sloping downward from said third and fourth generally horizontal truck-trailer support members adapted to engage said firth wheel connector end of said second truck-trailer and guide said fifth wheel connector end up to said third truck-trailer support member and also adapted to engage said rear wheel end of said second truck-trailer and guide said rear wheel end up to said fourth generally horizontal truck-trailer support member, means for connecting said truck-trailer fifth wheel king pin of said second truck-trailer to said third generally horizontal truck-trailer support member, and means for connecting said rear wheel end of said second truck-trailer to said fourth generally horizontal truck-trailer support member.

5. The truck-train apparatus as claimed in claim 4 further comprising means for raising and lowering said third generally horizontal first truck-trailer support member.

6. A truck-train apparatus comprising at least a first truck-trailer and a second truck-trailer, each comprising a fifth wheel connector end, a rear wheel end, a fifth wheel king pin connected to said fifth wheel connector end, a set of roadable wheels connected to said truck-trailer proximate said rear wheel end, a railway dolly having a first end and a second end, means for connecting said first truck-trailer fifth wheel end and said first truck-trailer rear wheel end to said first end of said railway dolly comprising a first generally horizontal truck-trailer support member pivotally connected to said railway dolly, a second generally horizontal truck-trailer support member pivotally connected to said railway dolly adjacent said first generally horizontal truck-trailer support member, a first incline plane ramp member sloping downward from said first and second generally horizontal truck-trailer support members adapted to engage said fifth wheel connector end of said first truck-trailer and guide said fifth wheel connector end up to said first generally horizontal truck-trailer support member and also adapted to engage said rear wheel end of said first truck-trailer and guide said rear wheel end up to said second generally horizontal truck-trailer support member, means for connecting said first truck-trailer fifth wheel king pin to said first truck-trailer support member, and means for connecting said first truck-trailer rear wheel end to said second generally horizontal truck-trailer support member.

7. The truck-train apparatus as claimed in claim 6 further comprising means for raising and lowering said first generally horizontal first truck-trailer support member.

8. The truck-train apparatus as claimed in claim 6 further comprising means for connecting said second truck-trailer fifth wheel end and said second truck-trailer rear wheel end to said second end of said railway dolly comprising a third generally horizontal truck-trailer support member pivotally connected to said railway dolly, a fourth generally horizontal truck-trailer support member pivotally connected to said railway dolly adjacent said first generally horizontal truck-trailer support member, a second incline plane ramp member sloping downward from said generally horizontal third and fourth truck-trailer support members adapted to engage said firth wheel connector end of said second truck-trailer and guide said firth wheel connector end up to said third generally horizontal truck-trailer support member and also adapted to engage said rear wheel end of said second truck-trailer and guide said rear wheel end up to said fourth generally horizontal truck-trailer support member, means for connecting said second truck-trailer fifth wheel king pin to said third truck-trailer support member, and means for connecting said second truck-trailer rear wheel end to said fourth truck-trailer support member.

9. The truck-train apparatus as claimed in claim 8 further comprising means for raising and lowering said third generally horizontal first truck-trailer support member.

* * * * *